United States Patent [19]

McClure

[11] Patent Number: 5,513,335
[45] Date of Patent: Apr. 30, 1996

[54] CACHE TAG MEMORY HAVING FIRST AND SECOND SINGLE-PORT ARRAYS AND A DUAL-PORT ARRAY

[75] Inventor: David C. McClure, Carrollton, Tex.

[73] Assignee: SGS-THOMSON Microelectronics, Inc., Carrollton, Tex.

[21] Appl. No.: 970,188

[22] Filed: Nov. 2, 1992

[51] Int. Cl.$^6$ .......................... G06F 12/00; G06F 15/00; G11C 13/00

[52] U.S. Cl. .......................... 395/457; 395/458; 395/471; 365/49

[58] Field of Search .................................. 395/425, 400, 395/457, 458, 471, 472; 365/49

[56] References Cited

U.S. PATENT DOCUMENTS

| | | | |
|---|---|---|---|
| 4,975,872 | 12/1990 | Zaiki | 365/49 |
| 5,056,002 | 10/1991 | Watanabe | 395/425 |
| 5,133,058 | 7/1992 | Jensen | 395/400 |
| 5,226,146 | 7/1993 | Milia et al. | 395/425 |
| 5,228,135 | 7/1993 | Ikumi | 395/425 |
| 5,249,283 | 9/1993 | Boland | 395/425 |
| 5,287,322 | 2/1994 | Rastegar | 365/230.05 |
| 5,319,768 | 6/1994 | Rastegar | 395/425 |
| 5,339,322 | 8/1994 | Rastegar | 371/51.1 |

FOREIGN PATENT DOCUMENTS 0439952  8/1991  European Pat. Off. .

OTHER PUBLICATIONS

Luo, "Performance Evaluation Of A Multiprocessor System with Dual–Port Directory Caches," IEEE Conf. On Communications, Computers and Signal Processing, May 1991, pp. 215–218.

Chuang et al. "An On–Chip 72K Pseudo Two–Port Cache Memory Subsystem," 1990 Symposium on VSLI Circuits, pp. 113, 114.

IBM Technical Disclosure Bulletin, vol. 23, No. 7B, Dec. 1980, New York, pp. 3461–3463, Yamour "Odd Even Interleave Cache With Optimal Hardware Array Cost, Cycle Time and Variable Data Port Width".

IEEE Journal Of Solid–State Circuits, vol. 26, No. 11, Nov. 1991, New York, pp. 1586–1592, Kobayashi et al. "A o.5–W 64–Kilobyte Snoopy Cache Memory with Pseudo Two–Port Operation".

*Primary Examiner*—David K. Moore
*Assistant Examiner*—Michael A. Whitfield
*Attorney, Agent, or Firm*—Kenneth C. Hill; Lisa K. Jôrgenson; Richard K. Robinson

[57] ABSTRACT

A cache tag memory device having a memory array comprising a first single-port memory array, a second single-port memory array, and a dual-port memory array. A first port, accessed by a local processor, may read from and write to its corresponding single-port memory array and the dual-port memory array. A second port, accessed through a global system bus, may also read from and write to its corresponding second single-port memory array and the dual-port memory array. Both ports operate asynchronously relative to each other. Status bits indicating the status of the entries in the first and second single-port memory arrays are stored in the dual-port memory array and may be altered by the global system while the local processor is performing its operations.

14 Claims, 1 Drawing Sheet

CACHE TAG MEMORY HAVING FIRST AND SECOND SINGLE-PORT ARRAYS AND A DUAL-PORT ARRAY

CROSS-REFERENCE TO RELATED APPLICATION

The present application is related to U.S. patent application Ser. No. 07/473,239, entitled DUAL-PORT CACHE TAG MEMORY, filed on Jan. 31, 1990 and assigned to the assignee herein named. The contents of the cross-referenced United States Patent Application is hereby incorporated herein by reference thereto.

BACKGROUND OF THE INVENTION

1. Field of the Invention

The present invention relates in general to digital computer systems, and more particularly to cache memory systems.

2. Description of the Prior Art

Cache memories are used in many computer systems to improve system performance. A cache memory is a relatively small, fast memory which resides between a central processor and main system memory. Whenever the processor reads the contents of a memory location which is stored in the cache memory, the time required to access such location is drastically reduced. A good cache technique can provide a "hit ratio" of well over ninety percent, meaning that no main memory access is necessary for over ninety percent of the read operations performed. Access of data which is stored in the cache can improve access times by factors of three to ten times.

A cache performs functions requiring two different types of memory. The first type is the data memory, in which the data is actually stored. The second type is known as a tag memory, or tag RAM, which is used to determine which memory locations are actually stored in the cache. In general, the cache tag RAM contains a plurality of entries corresponding to the entries of the data cache. Each entry is indexed by some number of least significant bits of the address generated by the central processor, with the tag entry itself containing the most significant bits of the memory location which is stored in the corresponding data cache entry. If the most significant bits stored in the cache tag entry match the most significant bits of the address currently being generated, with the least significant bits of this address acting as an index to the tag RAM, a cache "hit" has occurred and the data to be read may be taken from the corresponding data cache entry. If data corresponding to the desired address is not located in the data cache, the tag entry will not match the most significant bits of the address, and a "miss" occurs. This indicates that the data must be retrieved from main system memory and placed into the data cache. At this time, the current contents of the cache tag entry are overwritten with the most significant bits of the newly retrieved address.

In multi-processor systems, it is possible to provide each processor in a system with its own cache memory. Each local processor accesses its own cache whenever possible, and accesses main system memory through a system bus only when necessary.

This situation introduces an important problem known as the "cache coherency problem." This problem arises whenever it is possible for shared variables in main system memory to be accessed by two or more processors in the system. These processors can be local central processing units, or input/output devices attached to the bus. The cache coherency problem arises when a single memory location is cached in two or more local caches. If one of the processors writes a new value into that memory location, it will be inconsistent with the value of the same variable, or main memory location, currently cached in the other caches. The cache coherency problem also arises when a non-caching device writes to a location in system memory which has been cached by another device.

One technique utilized in dealing with the cache coherency problem is to have all local processors having caches monitor, or "snoop," the main system bus at all times. If another processor or device writes data to a memory location which is currently stored in a local cache, the local cache entry is invalidated. If that location is later accessed by the local processor, the updated data is then retrieved from the main system memory.

Using a dual-port memory array in this manner, however, results in an area penalty on the tag RAM chip. This is because a dual-port memory, compared to a single-port memory array, can be two and a half to three and a half times larger, or more.

Therefore, it would be desirable to provide a cache tag memory which reduces space consumption as well as maintain the coherency of the cache memory.

SUMMARY OF THE INVENTION

A cache tag memory device is provided which has a memory array comprising a first single-port memory array, a second single-port memory array, and a dual-port memory array. A first port, accessed by a local processor, may read from and write to its corresponding single-port memory array and the dual-port memory array. A second port, accessed through a global system bus, may also read from and write to its corresponding second single-port memory array and the dual-port memory array. Both ports operate asynchronously relative to each other. Status bits indicating the of the entries in the first and second single-port memory arrays are stored in the dual-port memory array and may be altered by the global system while the local processor is performing its operations.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
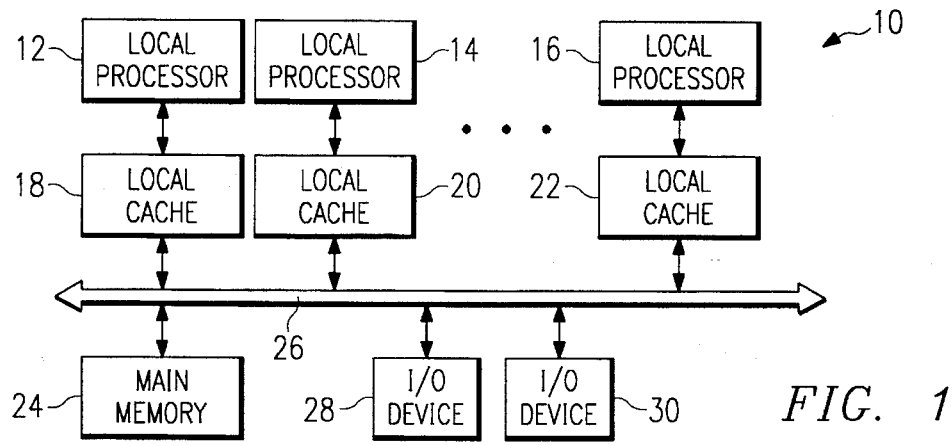
FIG. 1 is a high level block diagram of a multi-processor computer system.

Referring to FIG. 1, a multi-processor computer system is illustrated and referred to generally with the reference number 10. Local processors 12, 14, 16 are each provided with a local cache memory 18, 20, 22. The processors 12, 14, 16 communicate with each other and with a main system memory 24 through a system bus 26. A plurality of input/output devices 28, 30 are also attached to the system bus 26. Input/output devices 28, 30 typically do not contain local cache memories.

The problem of maintaining coherency between shared variable stored in the various local cache memories 18, 20, 22 can arise in several ways. In one, for example, local cache memories 18 and 20 may each contain a copy of a shared variable from main system memory 24. If local processor 14 updates the value of the shared variable, local cache 20 will be updated as will main system memory 24. In order to ensure coherency of cache memory 18, a technique as disclosed in U.S. patent application Ser. No. 07/473,239, entitled DUAL-PORT CACHE TAG MEMORY, filed on Jan. 31, 1990, which is incorporated herein by reference, is utilized to ensure that the outdated value for such local variable stored in cache memory 18 is marked as invalid. A similar situation can occur if input/output device 28 writes a value to main memory 24. If such memory location has previously been cached in local cache memory 18, the current memory data and the data in local cache memory 18 will not be the same.

Figure 2:
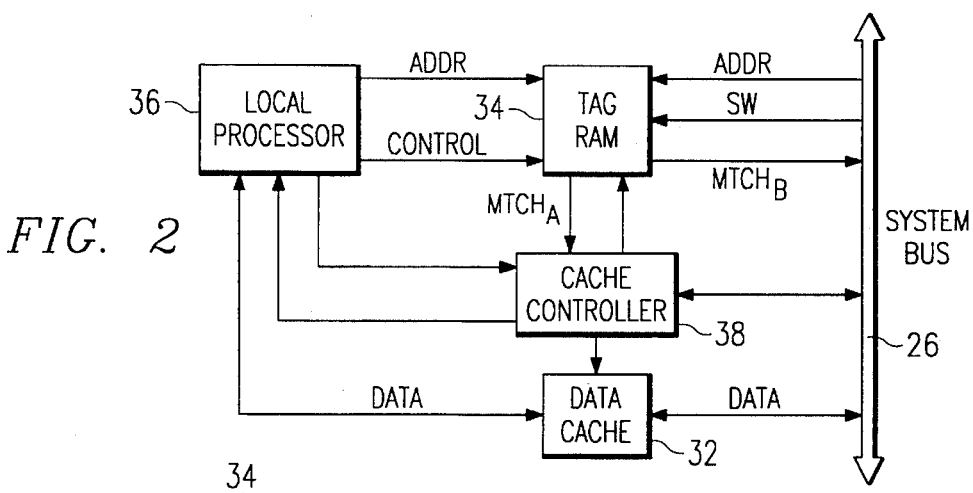
FIG. 2 is a high level block diagram showing a cache memory utilizing a cache tag memory according to the present invention.

Referring to FIG. 2, a high level block diagram showing a cache memory utilizing a cache tag memory according to the present invention is depicted. A preferred system for ensuring cache coherency in a single or multi-processor system will also be described. A data cache 32 and cache tag RAM 34 communicate with system bus 26 and local processor 36. Cache controller 38 performs the usual cache control functions found in caches which are suitable for use with single processor systems.

Data cache 32 exchanges data with the local processor 36 and system bus 26 under control of cache controller 38. Various control signals are exchanged by the local processor 36 and cache controller 38, and between cache controller 38 and system bus 26. Address and control signals are communicated from local processor 36 to cache tag RAM 34. Address and control signals are also communicated between cache tag RAM 34 and system bus 26.

In some cache memory formats, a control signal SW is communicated to cache tag RAM 34 from system bus 26 to indicate that a write operation, referred to as a snoop write, is occurring on the system bus 26. A control signal $MTCH_B$ is returned to system bus 26 whenever a system bus address matches an entry in cache tag RAM 34 during a snoop write operation. The signal $MTCH_B$ can be used as desired by the system in performance of cache control functions.

Cache tag RAM 34 also passes a signal $MTCH_A$ to cache controller 38. $MTCH_A$ indicates that the memory location currently being addressed by local processor 36 resides in the data cache 32, and that the entry is currently valid. Cache controller 38 then causes the location being accessed by local processor 36 to be read directly from data cache 32. If $MTCH_A$ indicates a miss, cache controller 38 causes the contents of the address location to be accessed from main memory over system bus 26.

Figure 3:
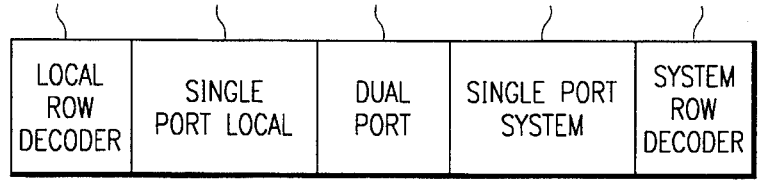
FIG. 3 is a block diagram of a preferred cache tag memory.

FIG. 3 is a block diagram of a preferred cache tag memory, referred to generally by the reference number 34. Cache tag memory 34 includes a first single-port memory array 40 with a corresponding row decoder 42. In the preferred embodiment, the first single-port memory array 40 is dedicated to a local processor. A second single-port memory array 44 and corresponding row decoder 46 is preferably dedicated to the system or main memory. Finally, a dual-port memory array 48 is utilized to store information or status bits about the cache memory. The status bits stored in the dual-port memory array 48 are shared by both the first and second single-port memory arrays 40, 44. Examples of status bits include a snoop valid bit, parity bit, or bits required for MOESI protocol. MOESI stands for Modified, Owned, Exclusive, Shared, and Invalid, and is utilized to indicate cache states. Essentially, any bit which may be altered by the system port while the local processor is performing its operations is stored in the dual-port memory array 48.

The size difference between a dual-port memory array and a single-port memory array can be two and a half to three and a half times larger, or more. Thus, having a cache tag memory which has two single-port memory arrays and a small dual-port memory array results in space savings on the chip. For example, the area difference between an all dual-port cache tag memory and the preferred cache tag memory is calculated below for a cache tag memory which utilizes a tag which is 16 bits wide plus 2 status bits (total 18 bits wide).

all dual-port: 18 bits×R preferred cache tag: (2 bits×R)+(16 bits×2)

The ratio of the size of a dual-port to the size of a single-port memory array is denoted by the variable R. If R=2.5, the all dual-port cache tag memory is 22% larger than the preferred cache tag memory. If R=3.0, the all dual-port cache tag memory is 42% larger. Finally, if R=3.5, the all dual-port cache tag memory is 62% larger than the preferred cache tag memory array.

Figure 4:
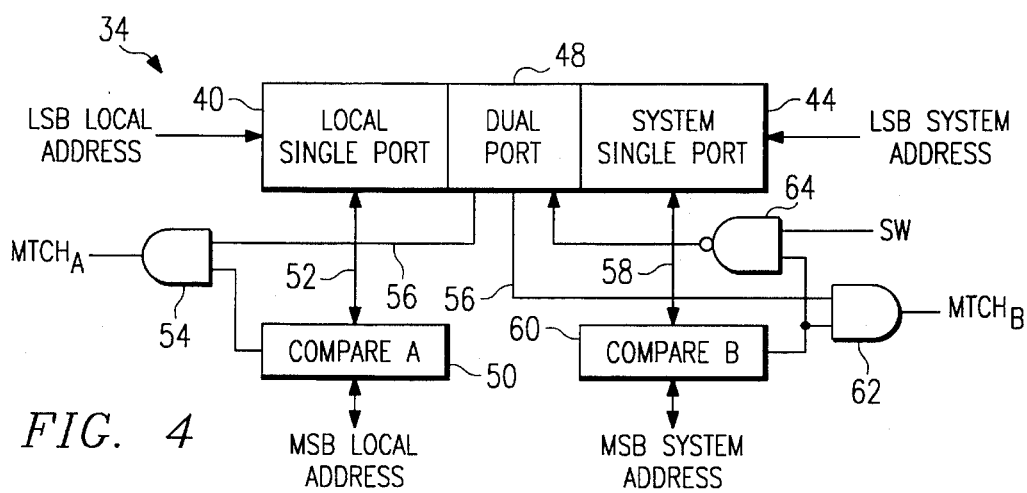
FIG. 4 is a more detailed block diagram of a preferred cache tag memory.

Referring to FIG. 4, a block diagram of a preferred cache tag RAM 34 is illustrated. The cache tag RAM 34 includes a first single-port memory array 40 dedicated to the local processor, a second single-port memory array 44 dedicated to the system or main memory, and a dual-port memory array 48. As discussed above, the dual-port memory array 48 stores information or status bits about the cache memory, and its entries are shared by the two single-port memory arrays 40, 44.

First single-port memory array 40 is addressed by the least significant bits (LSB) of the address from the local processor. The most significant bits (MSB) of the local address are input to a comparator 50 where they are compared with the first single-port memory array 40 entry currently selected by the local address LSB, which is available on line 52. A logical one is output from comparator 50 if the selected entry matches the MSB of the local address, and is connected to one input of AND gate 54. The snoop valid bit 56 from the corresponding address is also connected as an input to AND gate 54, and the output of AND gate 54 defines the signal $MTCH_A$. Thus, signal $MTCH_A$ is a logical one, indicating a cache hit, only if the first single-port memory array 40 entry indexed by the LSB of the local address matches the MSB of the local address, and the corresponding snoop valid bit 56 for that entry is a logical one.

Second single-port memory array 44 is addressed by the LSB of the system address. The entry corresponding to such location within the array is output on data line 58 and connected to comparator 60. Comparator 60 compares the entry present on line 58 with the MSB of the system address, generating a logical one if they match. The output of comparator 60 is connected to an input of both AND gates 62, 64. The snoop valid bit 56 of the entry indexed by the LSB of the system address is also connected to AND gate 62. The signal MTCH$_B$ is a logical one only if the selected entry matches the MSB of the system address, and the snoop valid bit 56 has a value of logical one. Some cache systems, however, do not require the snoop valid bit 56 to be monitored in this manner, so the signal MTCH$_B$ is a logical one if the selected entry matches the MSB of the system address.

In some cache formats, it is desirable to have a snoop write signal (SW) connected to a second input of AND gate 64. The output of AND gate 64 will be a logical one only if the address MSB on the system bus matches the entry in the second single-port memory array 44 indexed by the system address LSB, and a write operation is being performed on the system bus. In such event, the value stored in the data cache for such entry is now out of date, and must be marked as invalid. When the output of AND gate 64 is a logical one, the snoop valid bit of the entry indexed by the LSB of the current system address is reset to a logical zero. This will cause any future accesses of this entry by the local processor to indicate a miss, since the output of AND gate 54 for such entry will now be a logical zero.

When the data cache is being reloaded, requiring a write to cache tag RAM 34, the desired address appears on both the local bus and the system bus. The address tag is written into the first single-port memory array 40 and the corresponding cell in the second single-port memory array 44. The status bits are also written into the dual-port memory array 48 at this time. Design of a particular device can allow tags written into the second single-port memory array 44 to be written through either the first port or the second port. Snooping occurs as described with reference to FIG. 4, so that entries are invalidated or the status bits are altered as snoop hits are registered. The local processor does not need to be halted as the status bits are altered by the system due to the dual-port nature of the status bit cells.

Upon reference to the description above, those skilled in the art will appreciate that the described invention can result in a significant savings of space on a RAM chip. Utilizing a cache tag memory array which has both single-port and dual-port memory arrays, a significant savings of space can be realized. This is due to the fact that dual-port memory arrays may be two and a half to three and a half times larger, or more, than single-port memory arrays.

While the invention has been particularly shown and described with reference to a preferred embodiment, it will be understood by those skilled in the art that various changes in form and detail may be made therein without departing from the spirit and scope of the invention.

What is claimed is:

1. A cache tag memory, comprising:
    a first single-port memory array having a plurality of entries;
    a dual-port memory array having a plurality of entries corresponding to the plurality of entries in the first single-port memory array;
    a second single-port memory array having a plurality of entries corresponding to the plurality of entries in the dual-port memory array and the first single-port memory array;
    a first memory port capable of writing entries to said first single-port memory array said second single-port memory array, and said dual-port memory array, and capable of reading entries from said first single-port memory array and said dual-port memory array;
    means for, when data is written to said dual-port array and said first and second single-port arrays through said first memory port, writing identical data into corresponding entries of said first and second single-port arrays;
    a second memory port capable of reading entries from said second single-port memory array and said dual-port memory array, and capable of writing entries to said dual-port memory array;
    a first comparator connected to said first memory port for comparing an array entry selected by a first portion of a local address with a second portion of the local address, and for generating a signal indicative of a match; and
    a second comparator connected to said second memory port for comparing an array entry selected by a first portion of a global address with a second portion of the global address, and for generating a signal indicative of a match.

2. The cache tag memory of claim 1, wherein a valid indicator state composed of a bit or bits is stored in said dual-port memory array to indicate the validity of an entry stored in the first and second single-port memory arrays.

3. The cache tag memory of claim 2, wherein said valid state indicator corresponding to said entry is set to a first value when a new value is written to the entry.

4. The cache tag memory of claim 3, further comprising:
    comparison logic for determining whether the value of the entry indexed by a first portion of a global system address is the same as a second portion of the global system address, thereby defining a match; and
    logic means for setting the valid state corresponding to such indexed entry to a second value if a match occurs during a global system write operation.

5. The cache tag memory of claim 4, further comprising logic means for setting the valid state corresponding to such indexed entry to the second value if a match occurs during a global system read operation.

6. The cache tag memory of claim 4, wherein said comparison logic comprises a logic gate which logically combines said valid state and the output of the first comparator.

7. The cache tag memory of claim 6, wherein said comparison logic comprises a logic gate which logically combines said valid state and the output of the second comparator.

8. The cache tag memory of claim 4, wherein said logic means comprises a logic gate which logically combines a snoop write signal and the output of the second comparator.

9. The cache tag memory of claim 1, further comprising control circuitry for writing into the first and second single-port memory arrays.

10. The cache tag memory of claim 1, wherein at least one bit position in the dual-port memory array comprises a parity bit.

11. A cache memory subsystem, comprising:
    a cache tag memory, adapted for connection to a local processor and a system bus, such cache tag memory including a first single-port memory array portion, a second single-port memory array portion, and a dual-port array portion, each of such portions having a plurality of entries;
    a data cache for storing a plurality of entries corresponding to the entries in the first single-port memory array portion, the second single-port memory array portion, and the dual-port array portion;
    a cache controller for controlling exchanges of data or control signals between the local processor and the system bus;

means for storing, when data is written to said dual-port array portions and said first and second single-port memory array portions through a first port, identical address data corresponding entries of the first and second single-port memory array portions;

means for reading entries from said second single-port array portion and said dual-port memory array portion and for writing entries to said dual-port memory array portion, through a second port;

means, connected to the first single-port memory array portion, for generating a first match signal for indicating a memory location addressed by the local processor resides in the data cache;

means, connected to the dual-port memory array portion, for generating a valid signal for indicating (i) said memory location addressed by the local processor is valid;

means, connected to the second single-port memory array portion, for generating a second match signal for (ii) indicating a second memory location addressed by the system bus matches an entry in the cache tag memory.

12. The cache memory of claim 11, further comprising means for generating a control signal to be communicated to the cache tag memory from the system bus indicating a write operation is occurring on the system bus.

13. The cache memory of claim 11, further comprising means for invalidating an entry in the cache tag if the entry is accessed globally.

14. The cache memory of claim 11, wherein said means for generating the second match signal for indicating the memory location addressed by the system bus matches an entry in the cache tag memory generates such second match signal only when a write operation is occurring on the system bus.

* * * * *